United States Patent
Weinberger

(10) Patent No.: US 9,969,637 B2
(45) Date of Patent: May 15, 2018

(54) PROCESS AND FACILITY FOR TREATING AMMONIUM-CONTAINING WASTEWATER

(71) Applicant: DENNERT PORAVER GMBH, Postbauer-Heng (DE)

(72) Inventor: Karl Weinberger, Bischofsmais (DE)

(73) Assignee: Dennert Poraver GmbH, Postbauer-Heng (DE)

( * ) Notice: Subject to any disclaimer, the term of this patent is extended or adjusted under 35 U.S.C. 154(b) by 0 days. days.

(21) Appl. No.: 15/212,320

(22) Filed: Jul. 18, 2016

(65) Prior Publication Data
US 2017/0015576 A1    Jan. 19, 2017

(30) Foreign Application Priority Data

Jul. 16, 2015  (DE) .................. 10 2015 213 417

(51) Int. Cl.
*C02F 3/30*     (2006.01)
*C02F 3/10*     (2006.01)
(Continued)

(52) U.S. Cl.
CPC ............. *C02F 3/307* (2013.01); *B03C 1/30* (2013.01); *C02F 1/488* (2013.01); *C02F 3/107* (2013.01);
(Continued)

(58) Field of Classification Search
CPC ......... C02F 3/307; C02F 1/488; C02F 3/107; C02F 3/109; C02F 3/348; C02F 3/301;
(Continued)

(56) References Cited

U.S. PATENT DOCUMENTS 6,232,464 B1 *  5/2001  Lange ................ C12N 15/1017
                                                        204/602
8,637,300 B2 *  1/2014  Ruf ....................... C03B 19/108
                                                        435/176
(Continued)

FOREIGN PATENT DOCUMENTS

DE     102010034083 A1    2/2012
DE     102010039232 B4    2/2013
(Continued)

*Primary Examiner* — Fred Prince
(74) *Attorney, Agent, or Firm* — Laurence A. Greenberg; Werner H. Stemer; Ralph E. Locher

(57) ABSTRACT

A process and an associated facility for treating ammonium-containing wastewater are specified. Ammonium present in the wastewater is first oxidized to nitrite by use of aerobically oxidizing bacteria in an activation unit. Then ammonium and nitrite are reduced to elemental nitrogen anaerobically by use of ANAMMOX bacteria. Excess sludge arising in this operation is removed from the activation unit. ANAMMOX bacteria removed with the excess sludge are separated and returned to the activation unit. To facilitate the returning of the ANAMMOX bacteria, magnetic or magnetizable expanded glass particles are added, as colonization bodies for the ANAMMOX bacteria, to the wastewater in the activation unit. Expanded glass particles removed from the activation unit with the excess sludge are separated from the excess sludge magnetically and returned to the activation unit.

6 Claims, 2 Drawing Sheets

(51) Int. Cl.
*C02F 3/34* (2006.01)
*B03C 1/30* (2006.01)
*C02F 1/48* (2006.01)
C02F 3/00 (2006.01)
C02F 101/16 (2006.01)

(52) U.S. Cl.
CPC .............. *C02F 3/301* (2013.01); *C02F 3/305* (2013.01); *B03C 2201/20* (2013.01); *C02F 3/109* (2013.01); *C02F 3/348* (2013.01); *C02F 2003/001* (2013.01); *C02F 2101/16* (2013.01); *Y02W 10/15* (2015.05)

(58) Field of Classification Search
CPC .............. C02F 3/305; C02F 2003/001; C02F 2101/16; Y02W 10/15; B03C 1/30; B03C 2201/20

USPC ....... 210/605, 615, 616, 617, 630, 222, 223, 210/252, 259, 903
See application file for complete search history.

(56) References Cited

U.S. PATENT DOCUMENTS

| | | |
|---|---|---|
| 8,911,628 B2 | 12/2014 | Nyhuis |
| 2011/0198284 A1 | 8/2011 | Nyhuis |
| 2013/0264280 A1 | 10/2013 | Zhao et al. |
| 2014/0305867 A1 | 10/2014 | Nyhuis |

FOREIGN PATENT DOCUMENTS

| | | |
|---|---|---|
| EP | 2163524 B1 | 12/2011 |
| EP | 2366673 B1 | 5/2014 |
| EP | 2163525 B1 | 4/2015 |
| EP | 2792646 B1 | 5/2015 |

* cited by examiner

PROCESS AND FACILITY FOR TREATING AMMONIUM-CONTAINING WASTEWATER

CROSS-REFERENCE TO RELATED APPLICATION

This application claims the priority, under 35 U.S.C. § 119, of German application DE 10 2015 213 417.2, filed Jul. 16, 2015; the prior application is herewith incorporated by reference in its entirety.

BACKGROUND OF THE INVENTION

Field of the Invention

The invention pertains to a process for treating ammonium-containing wastewater. The invention further pertains to a facility for treating ammonium-containing wastewater.

Processes and facilities of these kinds are known for example from European patents EP 2 792 646 B1 (corresponding to U.S. patent publication No. 2014/0305867), EP 2 366 673 B1 (corresponding to U.S. Pat. No. 8,911,628), EP 2 163 524 B1 (corresponding to U.S. patent publication No. 2011/0198284), and EP 2 163 525 B1 (corresponding to U.S. patent publication No. 2011/0198284). In an activation tank, ammonium present in the wastewater is first oxidized to nitrite by aerobically oxidizing bacteria (AOB). Then ammonium and nitrite are reduced to elemental nitrogen anaerobically by ANAMMOX bacteria. Excess sludge arising in this operation is removed from the activation tank. With the known processes and facilities, the excess sludge removed from the activation tank is separated by a hydrocyclone or by sedimentation into a light phase (that is, a phase with relatively low specific weight) and a heavy phase (that is, a phase with relatively high specific weight). The heavy phase, containing on a majority basis the ANAMMOX bacteria removed with the excess sludge from the activation tank, is returned to the activation tank.

The efficiency of the aforementioned processes and facilities, though already good in comparison to other conventional deammonification techniques, is nevertheless limited by the comparatively inefficient isolation of the ANAMMOX bacteria by the hydrocyclone or sedimentation.

SUMMARY OF THE INVENTION

The object on which the invention is based is that of enabling particularly efficient treatment of ammonium-containing wastewater.

The starting point for the invention is a process for treating ammonium-containing wastewater wherein ammonium present in the wastewater is oxidized to nitrite by aerobically oxidizing bacteria (AOB) in a first operating stage in an activation unit. Then ammonium and nitrite are reduced to elemental nitrogen anaerobically by ANAMMOX bacteria in a second operating stage. In the aerobic operating stage, conventionally, oxygen (more particularly ambient air) is supplied to the wastewater collected in the activation unit. The excess sludge arising in the two-stage operation is removed from the activation unit. In the course of sludge removal, ANAMMOX bacteria as well are inevitably entrained out of the activation unit.

In order to enable efficient returning of these entrained ANAMMOX bacteria to the activation unit, in accordance with the invention, magnetic or magnetizable expanded glass particles are added, as colonization bodies for the ANAMMOX bacteria, to the wastewater in the activation unit. The implementation of the process is accompanied, as has been recognized, by the formation on the expanded glass particles of a biofilm, which contains the ANAMMOX bacteria required in the process. The ANAMMOX bacteria are therefore immobilized on the expanded glass particles.

The expanded glass particles removed from the activation unit with the excess sludge and colonized with ANAMMOX bacteria are separated from the excess sludge by magnetic interaction and returned to the activation unit. Through the magnetic separation of the expanded glass particles from the excess sludge, a substantial efficiency gain is achieved.

The colonized expanded glass particles are therefore deposited from the excess sludge, in particular, not using density differences (i.e. differences in the specific weight of the constituents of the excess sludge) and in particular not by means of a hydrocyclone or by sedimentation. In a preferred embodiment of the invention, the excess sludge removed from the activation unit also exhibits no significant inhomogeneities in density that could be exploited for the isolation of the ANAMMOX bacteria. In particular, therefore, in a preferred embodiment of the process of the invention, the ANAMMOX bacteria do not form a separable heavy phase of the excess sludge. Instead, the specific weight of those constituents of the excess sludge to which the ANAMMOX bacteria are assigned is determined substantially by the density of the expanded glass particles, and, in the operation of producing the expanded glass particles, through appropriate design of the expansion operation, this density has preferably been adjusted in such a way that the excess sludge has a substantially homogeneous density.

In principle it is possible, in the context of the invention, to use brand new (that is, untreated prior to use in the activation unit) expanded glass particles as colonization bodies for the process. As colonization bodies for the ANAMMOX bacteria, however, preference is given to employing expanded glass particles which have been precolonized beforehand with at least one microorganism other than ANAMMOX bacteria, more particularly with methane-producing bacteria. The expanded glass particles in this case are either precolonized in a preparatory step of the process of the invention, or expanded glass particles that have already been precolonized are employed as starting material for the process. In one advantageous embodiment of the invention, colonization bodies employed for the ANAMMOX bacteria are expanded glass particles which have been used previously—in particular over a period of at least two months and up to several years—as colonization bodies in a biogas plant. This use of the expanded glass particles in a biogas plant is described in patent application published, non-prosecuted German patent application DE 10 2010 034 083 A1 (corresponding to U.S. Pat. No. 8,637,300), the disclosure content of which is hereby referenced in full for the purposes of the present application. As has been recognized, the use of precolonized expanded glass particles produces a considerable acceleration and intensification of the colonization, in accordance with the process, of the expanded glass particles with the ANAMMOX bacteria. The use of precolonized expanded glass particles therefore makes an effective contribution to a further boost in the efficiency of the process.

Other features which are considered as characteristic for the invention are set forth in the appended claims.

Although the invention is described herein as embodied in a process and a facility for treating ammonium-containing wastewater, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

Figures 1, 2:
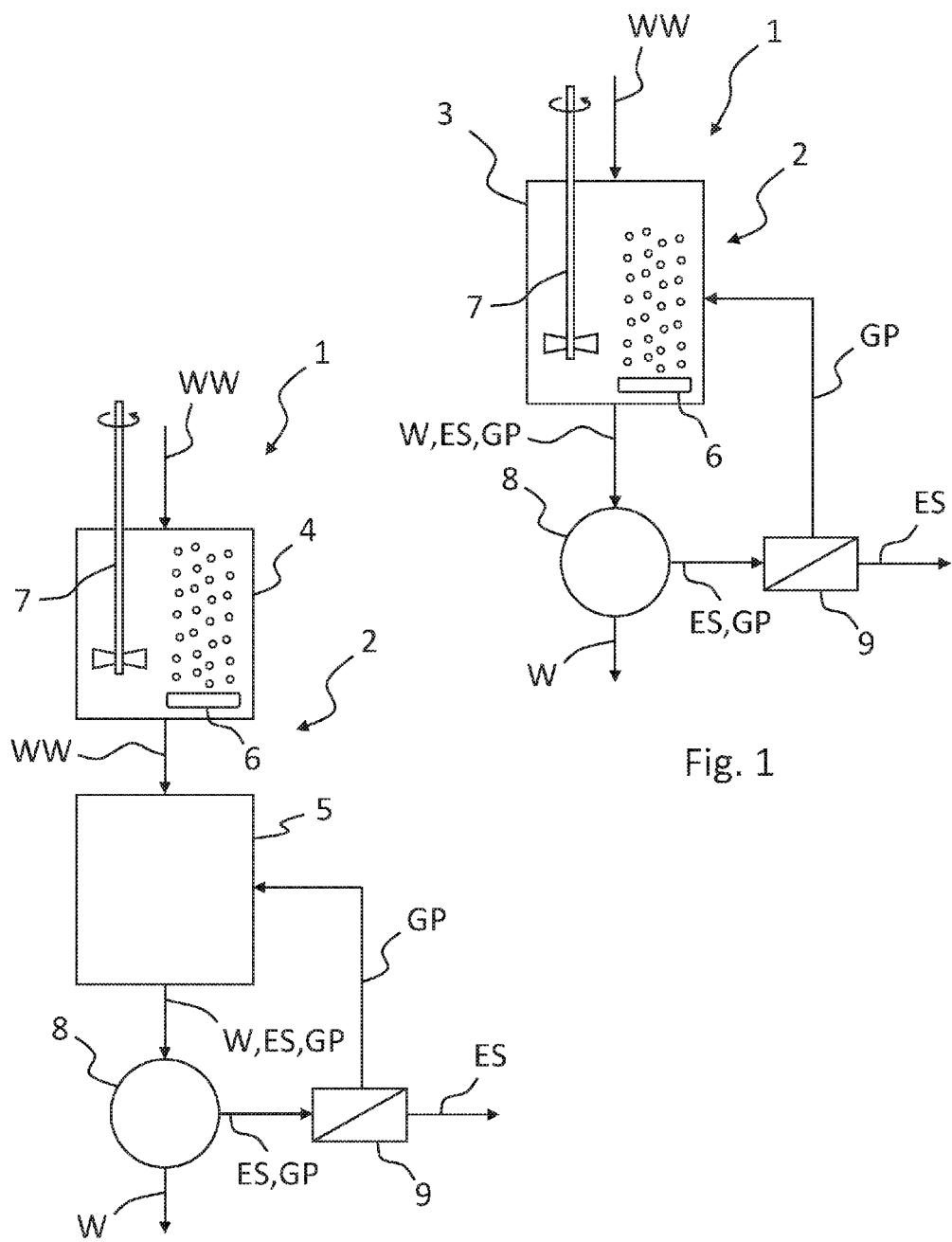
FIG. 1 is an illustration of a first embodiment of a facility containing a joint activation tank for both aerobically oxidizing ammonium to nitrite and unaerobically reducing nitrite to nitrogen according to the invention.
FIG. 2 is an illustration of a second embodiment of the facility containing separate activation tanks for aerobically oxidizing ammonium to nitrite and for unaerobically reducing nitrite to nitrogen, respectively.

Referring now to the figures of the drawings in detail and first, particularly to FIG. 1 thereof, there is shown a facility 1 of the invention that is set up generally for implementing the above-described process of the invention. The facility 1 accordingly encompasses an activation unit or facility 2 in which, in a first operating stage, ammonium present in wastewater WW can first be oxidized to nitrite aerobically by use of AOB, and in which, in a second operating stage, ammonium and nitrite can then be reduced to elemental nitrogen anaerobically by use of ANAMMOX bacteria. In a simple embodiment of the facility 1, the activation unit 2 contains a joint activation tank 3 in which both operating stages are carried out at the same location. Alternatively to this, the activation unit 2 contains different, spatially separate tanks or tank sections 4, 5 for the aerobic operating stage and for the anaerobic operating stage, respectively as shown in FIG. 2. For the supplied oxygen in the aerobic suboperation, the activation unit 2 preferably contains, in a manner customary per se, an aeration device 6 and also, optionally, a stirring mechanism 7. The facility 1 further contains a sludge removal device 8, by which excess sludge ES arising in this operation can be removed from the activation unit 2. The sludge removing device 8 being used for removing the excess sludge ES from the cleared water W. The facility 1 lastly contains means for separating ANAMMOX bacteria from the excess sludge ES removed from the activation unit 2, and for returning the ANAMMOX bacteria to the activation unit 2.

In accordance with the invention, as a means for separating the ANAMMOX bacteria from the excess sludge ES removed from the activation unit 2, a magnetic separator 9 is arranged in or downstream of the sludge removal device 8, and enables the magnetic or magnetizable expanded glass particles GP—and hence also the ANAMMOX bacteria colonized thereon—to be isolated from the excess sludge ES.

One particular embodiment of the invention is provided, lastly, by the use of magnetic or magnetizable expanded glass particles GP as colonization bodies for the ANAMMOX bacteria in the treatment—as described above—of ammonium-containing wastewater. Expanded glass particles GP used in this context are preferably particles which have been precolonized beforehand with at least one microorganism other than ANAMMOX bacteria, more particularly with methane-producing bacteria. In a judicious refinement, expanded glass particles GP are used which have been employed beforehand—more particularly over a period of at least two months up to several years—as colonization bodies in a biogas plant. Alternatively to this, expanded glass particles GP are used which have been precolonized beforehand—for a corresponding period of time—in the activation tank 3, 4, 5 of the biological stage of a sewage treatment plant.

The magnetic or magnetizable expanded glass particles GP employed for the process of the invention and in the facility 1 of the invention are preferably produced in the manner described in German patent DE 10 2010 039 232 B4. To accelerate the colonization of the expanded glass particles GP with the ANAMMOX bacteria, the expanded glass particles GP optionally carry a coating of an organic material.

In preferred exemplary embodiments of the invention, the facility 1 corresponds, in terms of its construction, to one of the facilities described in European patents EP 2 792 646 B1, EP 2 366 673 B1, EP 2 163 524 B1, or EP 2 163 525 B1, with the modification that magnetic separators 9 are provided in lieu of the density-specific separators (more particularly hydrocyclones) in those patents. As the activation unit 2, the facility 1 contains, in particular, an activation tank.

In the operation of the facility 1, the wastewater WW collected in the activation tank 3, 4 is admixed with magnetizable expanded glass particles GP which beforehand had been produced by the process described in German patent DE 10 2010 039 232 B4 and employed for four years as colonization bodies in a biogas plant. In the biogas plant, the expanded glass particles GP were precolonized with the microorganisms there, more particularly with methane-forming bacteria (as specified, for example, in published, non-prosecuted German patent application DE 10 2010 034 083 A1).

The magnetic separator or each magnetic separator 9 is formed, for example, by a pipe section of the sludge removal device 8 of the facility 1, in which a magnetic field directed transverse to the flow direction of the excess sludge ES can be generated by means of at least one electromagnet. The pipe section forming the separator is preferably itself not magnetic or magnetizable, and so the magnetic field collapses completely after the at least one electromagnet has been shut off. Under the action of the magnetic field, the expanded glass particles GP colonized with ANAMMOX bacteria deposit on the pipe walls and are thereby removed from the excess sludge ES.

For the returning of the expanded glass particles GP, the magnetic separator 9 at regular intervals or as and when required is separated in fluidic terms from the sludge removal device 8, and is connected to the activation tank 3, 5. Thereafter the electromagnet or each electromagnet is shut off and the separator 9 is flushed with sludge ES or wastewater WW, by which means the expanded glass particles GP collected in the separator 9, with the ANAMMOX bacteria colonized thereon, are washed back into the activation tank 3, 5.

Figure 3:
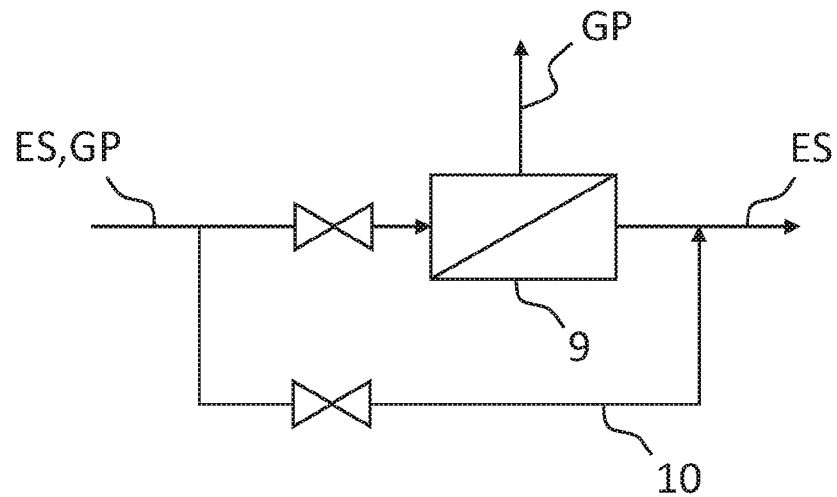
FIG. 3 is an illustration of an embodiment of a sludge removal device of the facility having a magnetic separator and a bypass line being guided in parallel to the magnetic separator.
Figure 4:
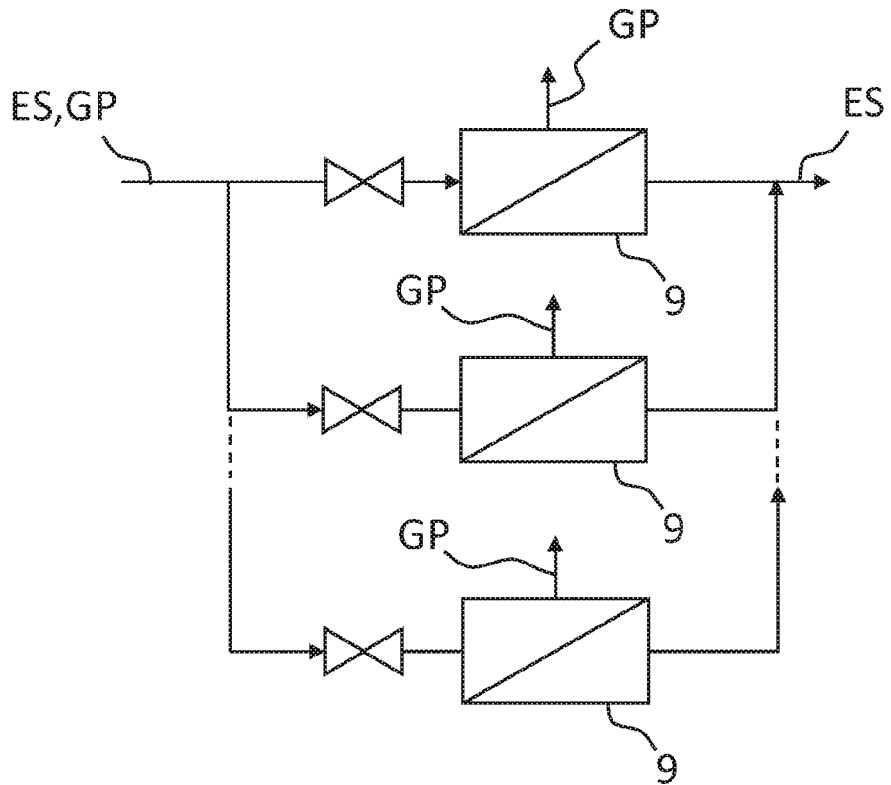
FIG. 4 is an illustration of another embodiment of the sludge removal device having a plurality of magnetic separators in parallel.

With certain embodiments of the facility 1, the sludge removal device 9 contains, parallel to the magnetic separator 9, a bypass line 10, via which any excess sludge ES removed during the wash phases as well is guided past the separator 9 as shown in FIG. 3. In an alternative embodiment of the facility 1, the sludge removal device 9 contains a plurality of magnetic separators 9 in parallel, which are washed in alternation as shown in FIG. 4.

In an investigation it was successfully demonstrated that under the conditions commonly prevailing in a deammonification stage of a sewage treatment plant, the expanded glass particles produced according to German patent DE 10 2010 039 232 B4 are colonized with ANAMMOX bacteria, and that the ANAMMOX bacteria colonized on the expanded glass particles exhibit a metabolic activity which is good and therefore sufficient for the process of the invention.

A matter to be clarified as part of these investigations was whether an active biofilm of deammonifying bacteria was formed on a sample of magnetizable expanded glass particles (also referred to as "foam glass particles", MFGP for short) from the applicant which has been immersed for approximately six months in a net fabric into the deammonification tank (operating according to the DEMON® process) of a municipal sewage treatment plant. The investigations were carried out by use of fluorescence in situ hybridization (FISH).

In parallel with this, samples of the MFGP were investigated in a laboratory test cell for their metabolic activity relative to the DEMON reactor sludge already investigated. In these investigations, the MFGPs were admixed with substrate (mixture of ammonium and nitrite) and the formation of gas ($N_2$) and also the decrease in substrate concentrations in the solution were monitored. Formation of gas was measured using eudiometers.

Before being added to the DEMON tank of the sewage treatment plant, the MFGPs under investigation were precolonized with methane bacteria over a period of approximately four years. The particles were investigated for ANAMMOX bacteria. A further subject for testing was whether the bacteria had colonized there as biofilm or in the already existing biofilm.

The FISH investigation was carried out using the AMX 820 DNA probe, which detects the species *Candidatus brocadia* anammoxidans and *Kuenenia stuttgartiensis*, which are predominant in deammonification. These representatives of the Planctomycetes represent the main population in the DEMON unit of the sewage treatment plant.

In the experiments by the FISH method it was found that the ANAMMOX bacteria formed a coherent biofilm on the MFGPs preconditioned in the biogas plant. The MFGPs themselves did not show a typically red color—therefore, the Anammox biofilm was not perceptible to the naked eye.

Test cell experiments for determining the metabolic activity, in comparison to fresh biomass sludge samples from the DEMON reactor, showed that the biofilm on the MFGP (with precolonization of the biofilm) exhibits good metabolic activity. This therefore confirms the results of the FISH investigations, and shows that the immobilization of the ANAMMOX biofilm on the MFGPs was successful.

The invention claimed is:

1. A process for treating ammonium-containing wastewater, which comprises the steps of:
   first oxidizing ammonium present in the ammonium-containing wastewater to nitrite by aerobically oxidizing bacteria in an activation unit;
   reducing the ammonium and the nitrite to elemental nitrogen anaerobically by providing ANAMMOX bacteria;
   removing excess sludge arising during operation from the activation unit;
   separating the ANAMMOX bacteria from the excess sludge and returning the ANAMMOX bacteria to the activation unit; and
   adding magnetic or magnetizable expanded glass particles, as colonization bodies for the ANAMMOX bacteria, to the ammonium-containing wastewater in the activation unit, and the expanded glass particles removed from the activation unit with the excess sludge are separated magnetically from the excess sludge and returned to the activation unit, wherein the expanded glass particles added to the activation unit as the colonization bodies for the ANAMMOX bacteria are particles which have been precolonized beforehand with at least one microorganism other than the ANAMMOX bacteria.

2. The process according to claim 1, wherein the expanded glass particles added to the activation unit as the colonization bodies for the ANAMMOX bacteria are particles which have been used beforehand as colonization bodies in a biogas plant.

3. The process according to claim 1, wherein the expanded glass particles added to the activation unit as the colonization bodies for the ANAMMOX bacteria are particles which have been precolonized beforehand with methane-producing bacteria.

4. A process for treating ammonium-containing wastewater, which comprises the steps of:
   providing magnetic or magnetizable expanded glass particles as colonization bodies for ANAMMOX bacteria in a treatment of the ammonium-containing wastewater, wherein the expanded class particles for the ANAMMOX bacteria are particles which have been precolonized beforehand with at least one microorganism other than the ANAMMOX bacteria, wherein ammonium present in the ammonium-containing wastewater is first oxidized to nitrite by aerobically oxidizing bacteria in an activation unit; and
   reducing the ammonium and the nitrite to elemental nitrogen anaerobically by use of the ANAMMOX bacteria.

5. The process according to claim 4, wherein the expanded glass particles have been used beforehand as colonization bodies in a biogas plant.

6. A facility for treating ammonium-containing wastewater, comprising:
   an activation unit in which ammonium present in the ammonium-containing wastewater can first be oxidized to nitrite by aerobically oxidizing bacteria, and in which the ammonium and the nitrite can be reduced to elemental nitrogen anaerobically by ANAMMOX bacteria;
   a sludge removal device by which excess sludge during operation can be removed from said activation unit;
   at least one magnetic separator for separating the ANAMMOX bacteria from the excess sludge removed from said activation unit, and for returning the ANAMMOX bacteria to said activation unit; and
   magnetic or magnetizable expanded glass particles being introduced into said activation unit as colonization bodies for the ANAMMOX bacteria, wherein the expanded glass particles added to said activation unit as the colonization bodies for the ANAMMOX bacteria are particles which have been precolonized beforehand with at least one microorganism other than the ANAMMOX bacteria.

* * * * *